US009135135B2

(12) United States Patent
Rao et al.

(10) Patent No.: US 9,135,135 B2
(45) Date of Patent: Sep. 15, 2015

(54) METHOD AND SYSTEM FOR AUTO-ADJUSTING THRESHOLDS FOR EFFICIENT MONITORING OF SYSTEM METRICS

(75) Inventors: Dinesh Rao, Bangalore (IN); Seshadri Chatterjee, Bangalore (IN)

(73) Assignee: SAP SE, Walldorf (DE)

( * ) Notice: Subject to any disclaimer, the term of this patent is extended or adjusted under 35 U.S.C. 154(b) by 638 days.

(21) Appl. No.: 13/536,459

(22) Filed: Jun. 28, 2012

(65) Prior Publication Data
US 2014/0005979 A1 Jan. 2, 2014

(51) Int. Cl.
G06F 11/34 (2006.01)

(52) U.S. Cl.
CPC ........ *G06F 11/3409* (2013.01); *G06F 11/3495* (2013.01); *G06F 2201/81* (2013.01)

(58) Field of Classification Search
CPC .................................................. G06F 11/3409
USPC ......................................................... 702/179
See application file for complete search history.

(56) References Cited

U.S. PATENT DOCUMENTS

| 5,031,089 | A | * | 7/1991 | Liu et al. ........................ 709/226 |
|---|---|---|---|---|
| 5,506,955 | A | | 4/1996 | Chen et al. |
| 5,619,631 | A | | 4/1997 | Schott |
| 6,128,642 | A | | 10/2000 | Doraswamy et al. |
| 6,425,006 | B1 | | 7/2002 | Chari et al. |
| 6,578,009 | B1 | | 6/2003 | Shinozaki |
| 6,782,350 | B1 | | 8/2004 | Burnley et al. |
| 6,995,768 | B2 | | 2/2006 | Jou et al. |
| 7,188,170 | B1 | | 3/2007 | Burnley et al. |
| 7,222,786 | B2 | | 5/2007 | Renz et al. |
| 7,302,502 | B2 | | 11/2007 | Beg |
| 7,376,902 | B2 | | 5/2008 | Lueckhoff |
| 7,587,720 | B2 | | 9/2009 | Evans et al. |
| 7,752,562 | B2 | | 7/2010 | Mohanty et al. |
| 8,032,621 | B1 | | 10/2011 | Upalekar et al. |
| 2001/0044840 | A1 | | 11/2001 | Carleton |
| 2003/0076936 | A1 | | 4/2003 | Locke et al. |
| 2003/0112269 | A1 | | 6/2003 | Lentz et al. |
| 2004/0010716 | A1 | | 1/2004 | Childress et al. |
| 2004/0064552 | A1 | | 4/2004 | Chong et al. |
| 2005/0071286 | A1 | | 3/2005 | Laicher et al. |
| 2005/0192930 | A1 | | 9/2005 | Hightower et al. |
| 2005/0219151 | A1 | | 10/2005 | Li et al. |

(Continued)

OTHER PUBLICATIONS

"U.S. Appl. No. 11/737,919, Advisory Action mailed Apr. 1, 2013", 3 pgs.

(Continued)

*Primary Examiner* — Bryan Bui
(74) *Attorney, Agent, or Firm* — Schwegman Lundberg & Woessner, P.A.

(57) ABSTRACT

Automatically setting a new threshold for a computer metric by detecting a first threshold for the computer metric, continuously taking measurements of the value of the computer metric at a predetermined rate, calculating the average of the measurements of the value of the computer metric over a predetermined time period, and calculating a second threshold for the computer metric based on the average of the values of the measurements. Calculating the second threshold may comprise establishing a base value for the threshold, establishing a maximum deviation of the threshold, and determining the average of the value of the measurements with respect to the base value and the maximum deviation.

18 Claims, 14 Drawing Sheets

(56) References Cited

U.S. PATENT DOCUMENTS

| | | |
|---|---|---|
| 2005/0228880 A1 | 10/2005 | Champlin |
| 2006/0117059 A1 | 6/2006 | Freeman, Jr. et al. |
| 2006/0130142 A1 | 6/2006 | Mester et al. |
| 2006/0143034 A1 | 6/2006 | Rothermel et al. |
| 2006/0200450 A1 | 9/2006 | Keane et al. |
| 2006/0218279 A1* | 9/2006 | Yamaguchi et al. .......... 709/226 |
| 2007/0011661 A1 | 1/2007 | Itoh |
| 2007/0033129 A1 | 2/2007 | Coates |
| 2007/0050777 A1 | 3/2007 | Hutchinson et al. |
| 2007/0079243 A1 | 4/2007 | Leigh et al. |
| 2007/0192720 A1 | 8/2007 | Alsup et al. |
| 2008/0126165 A1 | 5/2008 | Buchner |
| 2008/0163099 A1 | 7/2008 | Gu et al. |
| 2008/0163125 A1 | 7/2008 | Gu et al. |
| 2008/0263195 A1 | 10/2008 | Kroll |
| 2008/0270071 A1 | 10/2008 | Marvasti et al. |
| 2009/0149981 A1 | 6/2009 | Evans et al. |
| 2009/0210814 A1 | 8/2009 | Agrusa et al. |
| 2010/0229096 A1 | 9/2010 | Maiocco et al. |
| 2010/0268816 A1 | 10/2010 | Tarui et al. |
| 2010/0318931 A1 | 12/2010 | Boykin et al. |
| 2012/0117493 A1 | 5/2012 | Gu et al. |
| 2012/0124503 A1 | 5/2012 | Coimbatore et al. |

OTHER PUBLICATIONS

"U.S. Appl. No. 11/737,919, Appeal Brief filed Jul. 1, 2013", 25 pgs.
"U.S. Appl. No. 11/737,919, Examiners Answer mailed Oct. 25, 2013", 21 pgs.
"U.S. Appl. No. 11/737,919, Final Office Action mailed Nov. 29, 2012", 14 pgs.
"U.S. Appl. No. 11/737,919, Reply Brief filed Dec. 9, 2013", 14 pgs.
"U.S. Appl. No. 11/737,919, Response filed Feb. 28, 2013 to Final Office Action mailed Nov. 29, 2012", 15 pgs.
"U.S. Appl. No. 12/944,242 , Response filed Mar. 5, 2013 to Non Final Office Action mailed Nov. 7, 2012", 10 pgs.
"U.S. Appl. No. 12/944,242 , Response filed Oct. 21, 2013 to Final Office Action mailed Jun. 19, 2013", 10 pgs.
"U.S. Appl. No. 12/944,242, Advisory Action mailed Sep. 10, 2013", 3 pgs.
"U.S. Appl. No. 12/944,242, Final Office Action mailed Jun. 19, 2013", 12 pgs.
"U.S. Appl. No. 12/944,242, Non Final Office Action mailed Nov. 7, 2012", 10 pgs.
"U.S. Appl. No. 12/944,242, Response filed Aug. 19, 2013 to Final Office Action mailed Jun. 19, 2013", 9 pgs.
"U.S. Appl. No. 11/737,919 , Response filed Jul. 1, 2011 to Final Office Action mailed Apr. 7. 2011", 7 pgs.
"U.S. Appl. No. 11/737,919 Non-Final Office Action mailed Aug. 20, 2010", 14 Pgs.
"U.S. Appl. No. 11/737,919, Final Office Action mailed Apr. 7, 2011", 13 pgs.
"U.S. Appl. No. 11/737,919, Final Office Action mailed Oct. 16, 2009", 14 Pgs.
"U.S. Appl. No. 11/737,919, Non Final Office Action mailed Feb. 2, 2012", 14 pgs.
"U.S. Appl. No. 11/737,919, Non-Final Office Action mailed Jun. 8, 2009", 11 pgs.
"U.S. Appl. No. 11/737,919, Response filed Jan. 11, 2010 to Final Office Action mailed Oct. 16, 2009", 7 pgs.
"U.S. Appl. No. 11/737,919, Response filed Jun. 26, 2009 to Non Final Office Action mailed Jun. 8, 2009", 11 pgs.
"U.S. Appl. No. 11/737,919, Response filed Jun. 4, 2012 to Non Final Office Action mailed Feb. 2, 2012", 9 pgs.
"U.S. Appl. No. 11/737,919, Response filed U.S. Appl. No. 11/737,919, Response filed Jan. 20, 2011 to Non Final Office Action mailed Aug. 20, 2010", 8 pgs.
"U.S. Appl. No. 12/944,242, Advisory Action mailed Mar. 24, 2015", 5 pgs.
"U.S. Appl. No. 12/944,242, Final Office Action mailed Nov. 20, 2014", 14 pgs.
"U.S. Appl. No. 12/944,242, Non Final Office Action mailed Jun. 4, 2014", 13 pgs.
"U.S. Appl. No. 12/944,242, Non Final Office Action mailed Jun. 5, 2015", 12 pgs.
"U.S. Appl. No. 12/944,242, Response filed Mar. 10, 2015 to Final Office Action mailed Nov. 20, 2015", 10 pgs.
"U.S. Appl. No. 12/944,242, Response filed Aug. 15, 2014 to Non Final Office Action mailed Jun. 4, 2014", 12 pgs.

* cited by examiner

FIG. 2

| ALL SYSTEMS (130) | ABAP SYSTEMS (0) | JAVA SYSTEMS (47) | WEBSPHERE SYSTEMS (0) | NET SYSTEMS (0) |
| --- | --- | --- | --- | --- |
| 50A | 50B | 50C | 50D | 50E |

VIEW: STANDARD VIEW ▼  63  SYSTEM MONITORING ▲  WORKSTATION   DEFINE NEW QUERY  FILTER  SETTINGS  PERSONALIZE
57   65

| SYSTEM ID | TYPE  55 | INSTALLATION NUMBER | PRODUCT INSTANCE  59 | PRODUCT VERSION  61 |
| --- | --- | --- | --- | --- |
| C60 | APPLICATION SERVER JAVA, APPLICATION SERVER ABAP | N/A, 0020540341 | CRM APPLICATION SERVER JAVA, CRM APPLICATION SERVER ABAP | EHP1 FOR SAP CRM 7.0, EHP1 FOR SAP CRM 7.0 |
| C60 | APPLICATION SERVER JAVA, APPLICATION SERVER ABAP | N/A, 0020540341 | CRM APPLICATION SERVER JAVA, CRM APPLICATION SERVER ABAP | EHP1 FOR SAP CRM 7.0, EHP1 FOR SAP CRM 7.0 |
| B4X | APPLICATION SERVER ABAP, APPLICATION SERVER JAVA | 0020270862 | APPLICATION SERVER ABAP, APPLICATION SERVER JAVA | SAP NETWEAVER 7.3, SAP NETWEAVER 7.3 |
| B4Y | APPLICATION SERVER ABAP, APPLICATION SERVER JAVA | 0020270862 | APPLICATION SERVER ABAP, APPLICATION SERVER JAVA | SAP NETWEAVER 7.3, SAP NETWEAVER 7.3 |
| BXV | APPLICATION SERVER ABAP, APPLICATION SERVER JAVA | 0020270862 | APPLICATION SERVER ABAP, PI ADAPTER ENGINE (JAVA EE) | SAP NETWEAVER 7.3, SAP NETWEAVER 7.3 |
| SMQ | APPLICATION SERVER ABAP, APPLICATION SERVER JAVA | 0020270862 | SOLUTION MANAGER ABAP STACK, SOLUTION MANAGER JAVA STACK | SAP SOLUTION MANAGER 7.0 EHP1, SAP SOLUTION MANAGER 7.0 EHP1 |
| UBR | APPLICATION SERVER JAVA, APPLICATION SERVER ABAP | N/A | APPLICATION SERVER JAVA, APPLICATION SERVER ABAP | SAP EHP1 FOR SAP NW PI 7.1, SAP EHP1 FOR SAP NW PI 7.1 |
| IWC | APPLICATION SERVER ABAP, APPLICATION SERVER JAVA | 0020283901 | BUSINESS INTELLIGENCE, ENTERPRISE PORTAL | SAP EHP1 FOR SAP NETWEAVER 7.0, SAP EHP1 FOR SAP NETWEAVER 7.0 |
| LAB | APPLICATION SERVER ABAP, APPLICATION SERVER JAVA | 0020230702 | SOLUTION MANAGER ABAP STACK, SOLUTION MANAGER JAVA STACK | SAP SOLUTION MANAGER 7.0 EHP1, SAP SOLUTION MANAGER 7.0 EHP1 |
| MOM | APPLICATION SERVER ABAP, APPLICATION SERVER JAVA | SAP-INTERN | APPLICATION SERVER ABAP, PROCESS INTEGRATION | SAP NETWEAVER 7.3 |

LAST REFRESH: 22.09.2010 06:44:45 CET   REFRESH

| CPU Utilization | | |
|---|---|---|
| DATE | AVERAGE | CALCULATED THRESHOLD |
| 01-JAN-12 | 80% | |
| 02-JAN-12 | 82% | |
| 03-JAN-12 | 83% | |
| 04-JAN-12 | 85% | |
| 05-JAN-12 | 81% | |
| 06-JAN-12 | 79% | |
| 07-JAN-12 | 77% | 81% |
| 08-JAN-12 | 79% | |
| 09-JAN-12 | 80% | |
| 10-JAN-12 | 82% | |
| 11-JAN-12 | 75% | |
| 12-JAN-12 | 77% | |
| 13-JAN-12 | 85% | |
| 14-JAN-12 | 89% | 81% |
| 15-JAN-12 | 88% | |
| 16-JAN-12 | 85% | |
| 17-JAN-12 | 82% | |
| 18-JAN-12 | 85% | |
| 19-JAN-12 | 83% | |
| 20-JAN-12 | 89% | |
| 21-JAN-12 | 86% | 85% |
| 22-JAN-12 | 84% | |
| 23-JAN-12 | 88% | |
| 24-JAN-12 | 90% | |
| 25-JAN-12 | 89% | |
| 26-JAN-12 | 85% | |
| 27-JAN-12 | 87% | |
| 28-JAN-12 | 95% | 88% |
| 29-JAN-12 | 94% | |
| 30-JAN-12 | 93% | |
| 31-JAN-12 | 95% | |

*Fig. 9B*

METHOD AND SYSTEM FOR AUTO-ADJUSTING THRESHOLDS FOR EFFICIENT MONITORING OF SYSTEM METRICS

RELATED APPLICATION

The present application is related to U.S. patent application Ser. No. 12/944,242 entitled "Method and System for Easy Correlation between Monitored Metrics and Alerts," filed Nov. 11, 2010 and owned by the assignee of this application, which application is incorporated herein by reference.

FIELD

The present disclosure relates generally to computer performance monitoring. in one embodiment, the disclosure relates to methods and systems for auto-adjusting thresholds for metrics for computer systems.

BACKGROUND

There is monitoring information in computer systems that depicts the health of the system, and alerts that denote important and urgent actions. Typically, a user would like to know the status of various monitored computer metrics at the time when an alert occurred, or the number of alerts that occurred during periods when the metrics are being monitored. This might enable better diagnosing of a problem and may also indicate a possible resolution mechanism.

There can be various sources within a system from where monitored computer metrics and alerts are obtained. Whenever the measured value of the metric exceeds a certain threshold, the system administrator is notified using a notification (like Email, SMS, or an Alert), Once the Administrator gets such a notification, he or she analyses the error situation and tries to resolve the issue. In order to get these notifications, administrator needs to configure the thresholds for required metrics. Some metric thresholds may not be accurate or might change over time, resulting in false notification.

BRIEF DESCRIPTION OF DRAWINGS

The present disclosure is illustrated by way of example and not limitation in the figures of the accompanying drawings, in which like references indicate similar elements and in which:

FIG. 2 is an illustration of a system monitoring view of a technical monitoring work center in a computer system, in which an example embodiment can be implemented, depicting various systems that can be selected for monitoring;

FIG. 9B illustrates example calculations for the graphic of FIG. 9A;

DETAILED DESCRIPTION

The description that follows includes illustrative systems, methods, techniques, instruction sequences, graphical user interfaces, and computing machine program products that embody illustrative embodiments discussed herein. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide a method and system for correlating, for at least one managed system, monitored computer metrics and alerts associated with the monitored computer metrics, comprising selecting a monitored computer metric designated by a user, selecting a time scale designated by the user, and selecting a number of alerts associated with the monitored computer metric, with the alert being designated by the user. The monitored computer metric and the number of alerts are correlated over the selected time period, and a signal representing a graph of the correlated monitored computer metric superimposed with a number of alerts over the selected time period can be transmitted for presentation to the user-administrator. The user can select various monitored computer metrics, alerts and time periods. Stated another way, embodiments discussed herein represent monitored metrics and alerts in a unified user interface based on the dimension of time.

Figure 1:
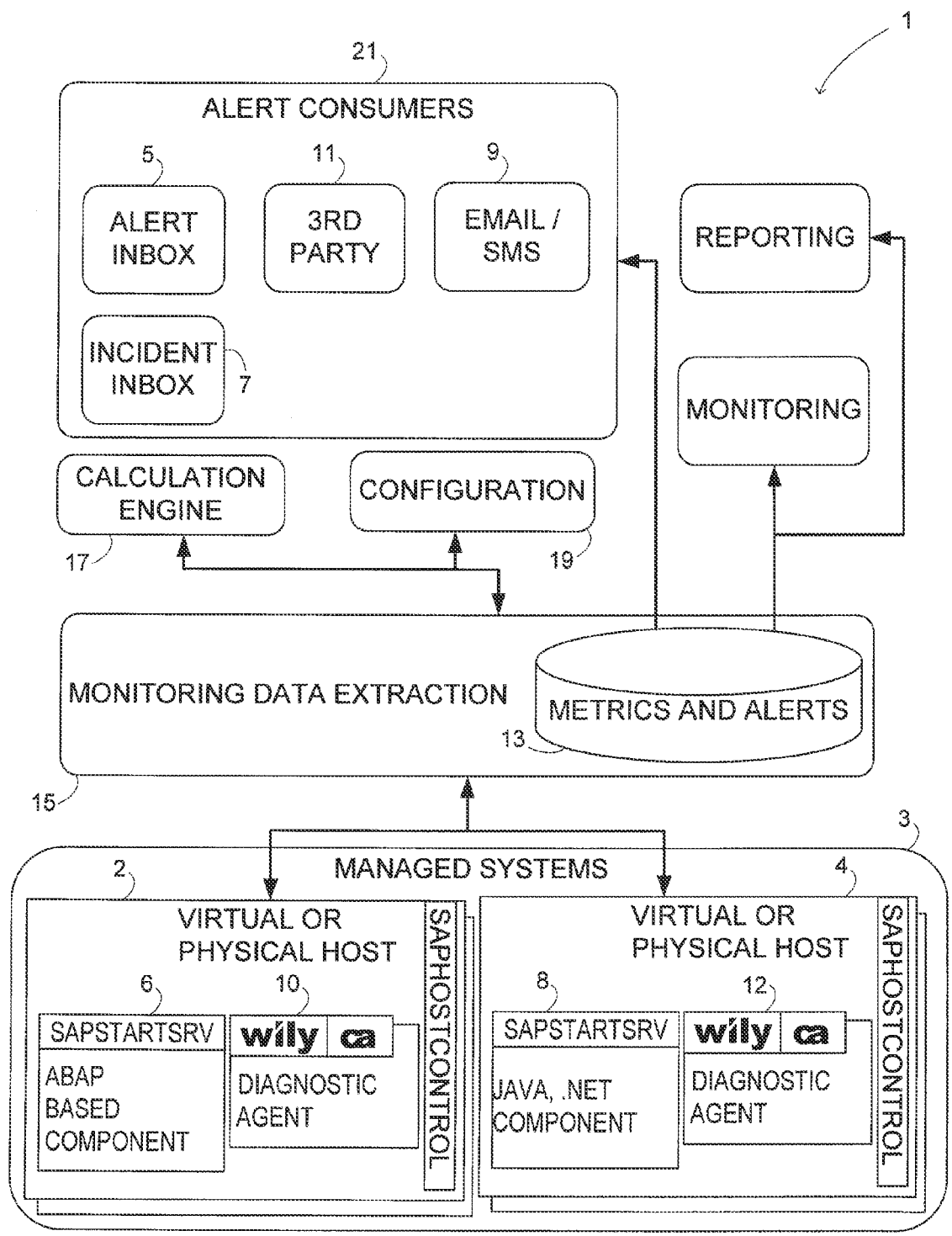
FIG. 1 is an illustration of a functional block diagram of a computer system from which an example embodiment can be launched.

While many systems may be used to implement the embodiments described herein, one exemplary system is seen in FIG. 1 in which the embodiment under discussion may be implemented. Functions needed for operation of these embodiments are known and can be seen in pending U.S. patent application Ser. No. 10/868,011 entitled "Performance Monitoring," described above as a Related Application FIG. 1 illustrates a diagram of a system monitoring infrastructure 1. This can be viewed as a work center. The system monitoring infrastructure 1 is that of SAP Solution Manager, explained subsequently. It will be appreciated that other monitoring infrastructures can be used. Managed systems 3 are the monitored systems associated with a customer site. These systems could be running advanced business application programming (ABAP) like in SAP ECC, or Java like in SAP NetWeaver Portal, or other systems like SAP master data management (MDM), text retrieval and information extraction (TREX), and the like. Managed systems 3 can be connected to infrastructure 1 during initial setup. As mentioned above, one example of infrastructure 1 can be SAP Solution Manager, currently publicly available. Monitoring data is collected on the managed systems 3 using agents. The agents periodically communicate with infrastructure 1. Managed systems 3 may include virtual or physical hosts 2 and 4, each of which may use an instance agent. SAPStartsrv 6 and 8 are shown as the instance agents, although others may be used. SAPstartsrv is available for administering and monitoring hosts and SAP instances and has a variety of Simple Object Access Protocol (SOAP) interfaces, with which the service can be used by remote clients. Remote clients might include a SAP Management Console used as a user interface for administration display and for monitoring, diagnosing, and/or adjusting parameters of one or more of the managed systems 3. An extended diagnostics application by CA Wily 10, 12, is shown as a diagnostic application that may be used, although other diagnostic applications may be used as well.

Monitoring data extraction module 15 is a generic framework that is capable of extracting monitoring data from the managed systems 3, whether they are ABAP, Java or others. This monitoring data extraction module 15 communicates with the agents running on managed systems 3 to collect monitoring data.

Calculation engine 17 is a runtime component that applies thresholds and rules on the collected metrics to calculate end-user alerts. As only one example, the calculation engine 17 may calculate how many problem events occur over a given time period and issue an alert when the number of events surpasses a threshold number. The calculation engine 17 may also be used to correlate computer metrics and alerts over time. As one example, the calculation engine may count the number of alerts occurring during a given time period and relate that number to the behavior of the computer metric over the same time period. The correlated monitored computer metrics and alerts may then be displayed to an administrator at the above user interface as discussed below with respect to FIGS. 6-8. Alternatively, a representation of the monitored computer metrics and the number of alerts can be routed to the user for correlation and display.

Alert Consumers module 21 is a set of alert consumers, which may be resident on separate client machines or on separate computer systems. Alert Consumers module 21 is a runtime component that routes the end-user alerts to the appropriate consumers, or users, for display on an end user interface. Alert Consumers module 21 can be viewed as a work center. A work center can allow system administrators to manage all of their administrative tasks centrally from one single point of control. Recurring administration tasks can be listed for each system of a solution with their status and their execution frequency (such as hourly, daily, weekly and monthly). Generally, this approach can be viewed as bundling role-based content with task-specific authorizations and a Web-based user interface. Work centers can deliver the functionality, components, and tools needed to manage a system's entire landscape throughout the IT lifecycle. For example, the tasks that administrators need to perform in their daily operations can be assembled in easy-to-use work centers for, as examples, System Landscape Management, System Administration and System Monitoring.

One of the alert consumers is the alert inbox 5 where alerts are visible. This can be the default consumer in infrastructure 1. Alert inbox 5 offers functionality to view and analyze further details of the alert and offer some guidance on issue resolution. Other alert consumers could be incident inbox 7, Email/SMS 9, and 3rd party alert inbox 11. These are alert consumers as used in the SAP solution manager, although other alert consumers can be used. As an example of usage of the foregoing alert consumers, there is a possibility, when an alert occurs, of automatically sending it to inbox 5 or to Email/SMS 9. There may also be a possibility to forward an alert automatically or manually to incident inbox 7, which could be a service desk. Third party tools for 3rd party alert box 11 may be HP Open View or IBM Tivoli, which can also consume alerts.

Metrics and Alerts storage 13 is a repository in infrastructure 1 that may contain the collected metrics from managed systems 3 and calculated end-user alerts from calculation engine 17. The monitoring data extraction module 15 collects metrics from managed systems 3 and stores them in Metrics and Alerts storage 13. The calculation engine 17 evaluates these metrics against thresholds and rules to generate end-user alerts, which can be stored in Metrics and Alerts storage 13.

Configuration component 19 is a design time component that describes monitoring meta data. It can be a central component that instructs the monitoring data extraction module 15 which metrics to collect, from which systems to collect, the frequency of metric data collection, and the like. It also provides the calculation engine 17 with information such as thresholds and rules (average, worst case, and the like). It instructs alert consumers module 21 on which is the appropriate alert consumer, i.e., whether to send to email/SMS 9, or the other alert consumers, or whether auto-reaction is needed, and the like. Auto-reaction is a function that allows the system to react automatically to an alert. The user can define auto reaction methods.

FIG. 2 illustrates a work center in which one embodiment can be implemented. The work center shown in FIG. 2 is a work center in infrastructure 1 (shown in FIG. 1) that helps a system administrator monitor the health of the system landscape. However, any number of additional work centers can be used. In the example of FIG. 2, there is an illustration of a System Monitoring view, which is one of the views in the work center offering a view of the current state of the system. It shows metrics and alerts for a selected system in a graphical way. This view can be opened or selected, using a navigation pane (not shown) by a system administrator to allow the administrator to monitor, diagnose and improve operations within the system. In the illustrated view, the system administrator has selected the System Monitoring view of the work station by, for example, clicking that function on a navigation pane (not shown). A pre-defined set of queries 50A-50E are exemplary queries that help filter different systems in the customer landscape. The current selection illustrated in FIG. 2 refers to query "All Systems" 50 A, although any of the other four systems, 50B-50E, could be selected. In selecting "All Systems" 50A, the administrator can select any of All Systems ID 53, along with the system type 55, installation number 57, product instance 59 and product version 61, which are listed for view by the administrator. The administrator can select a set of systems he or she is interested in. System monitoring button 63 offers a possibility to view monitoring details of the selected systems in the current window or a new window.

In operation, and following the illustration of FIG. 2, the administrator is taken to the details of the selected system by selecting one of the systems listed in System ID 53 as the desired system to monitor. For example, the administrator can select System B4Y, which could be application servers for JAVA and ABAP. That is, B4Y can be a dual stack system and hence, it could have both ABAP and JAVA. In the illustration, the administrator can select Application Server JAVA, with Product Version SAP NETWEAVER 7.3, SAP. The administrator will then be able to view which functions are occurring in that server.

Figure 3:
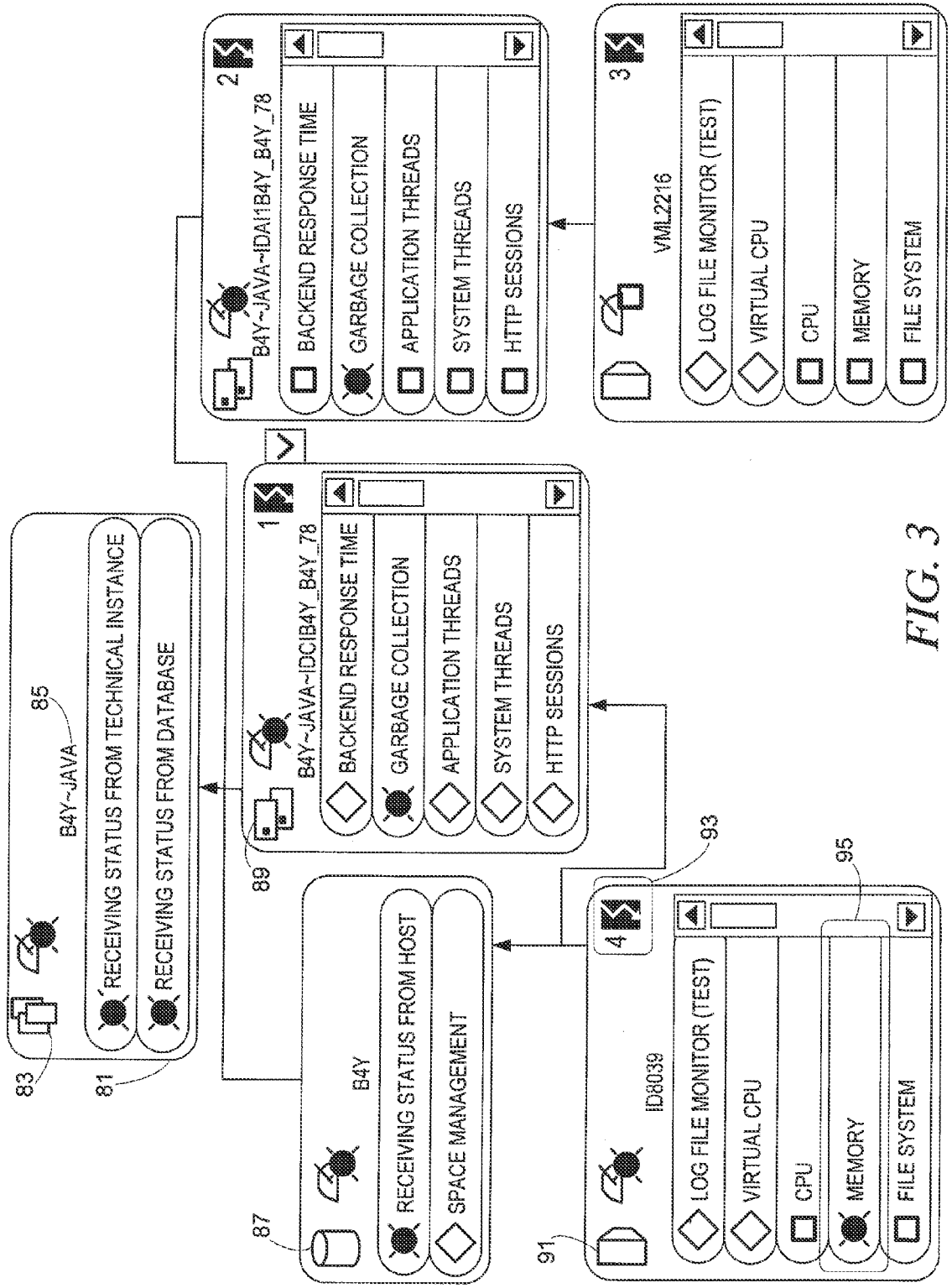
FIG. 3 is an illustration of details of a system of FIG. 2 that a system administrator selects for monitoring in an example embodiment.
Figure 4:
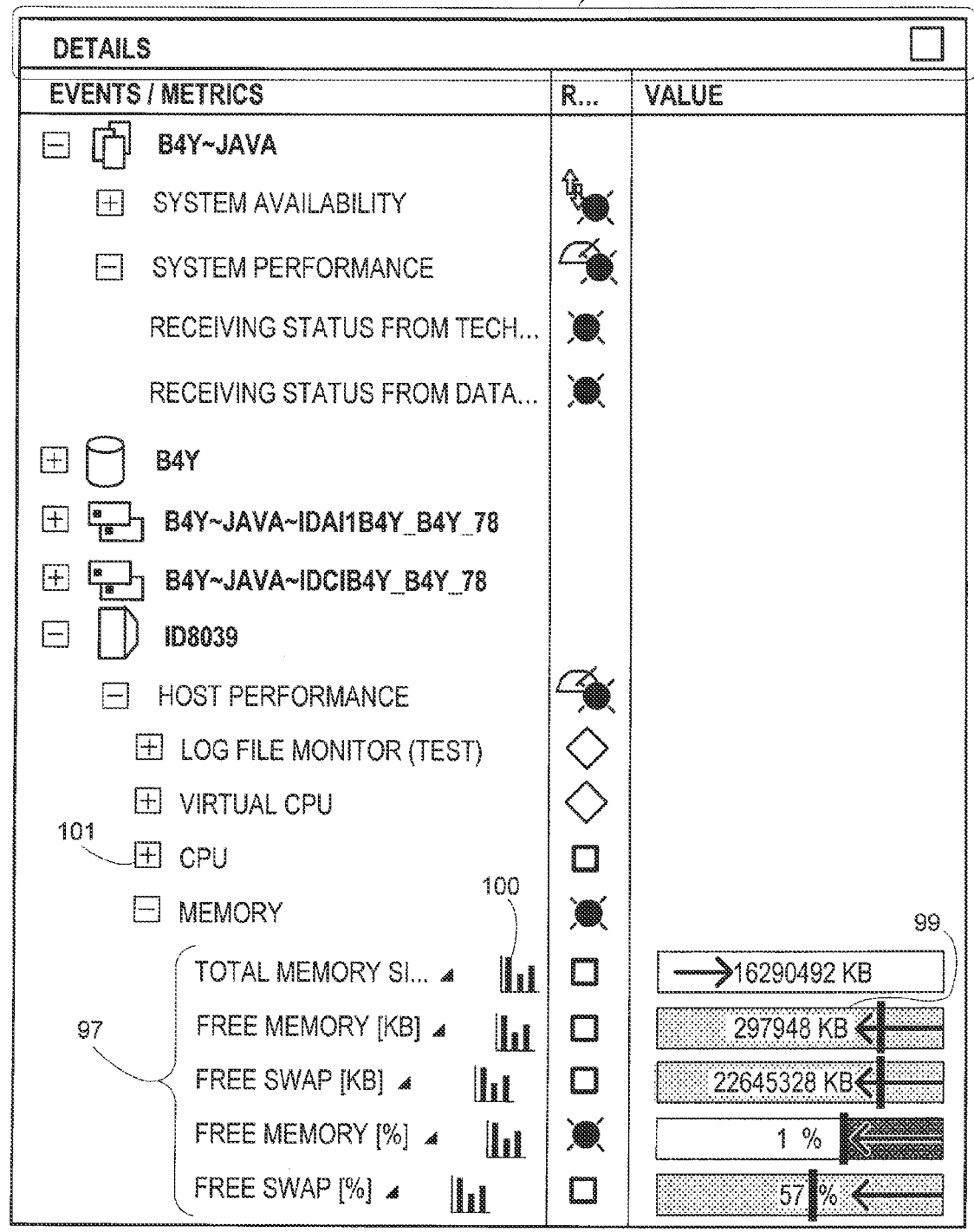
FIG. 4 is a navigation pane for the system illustrated in FIG. 3.
Figure 4A:
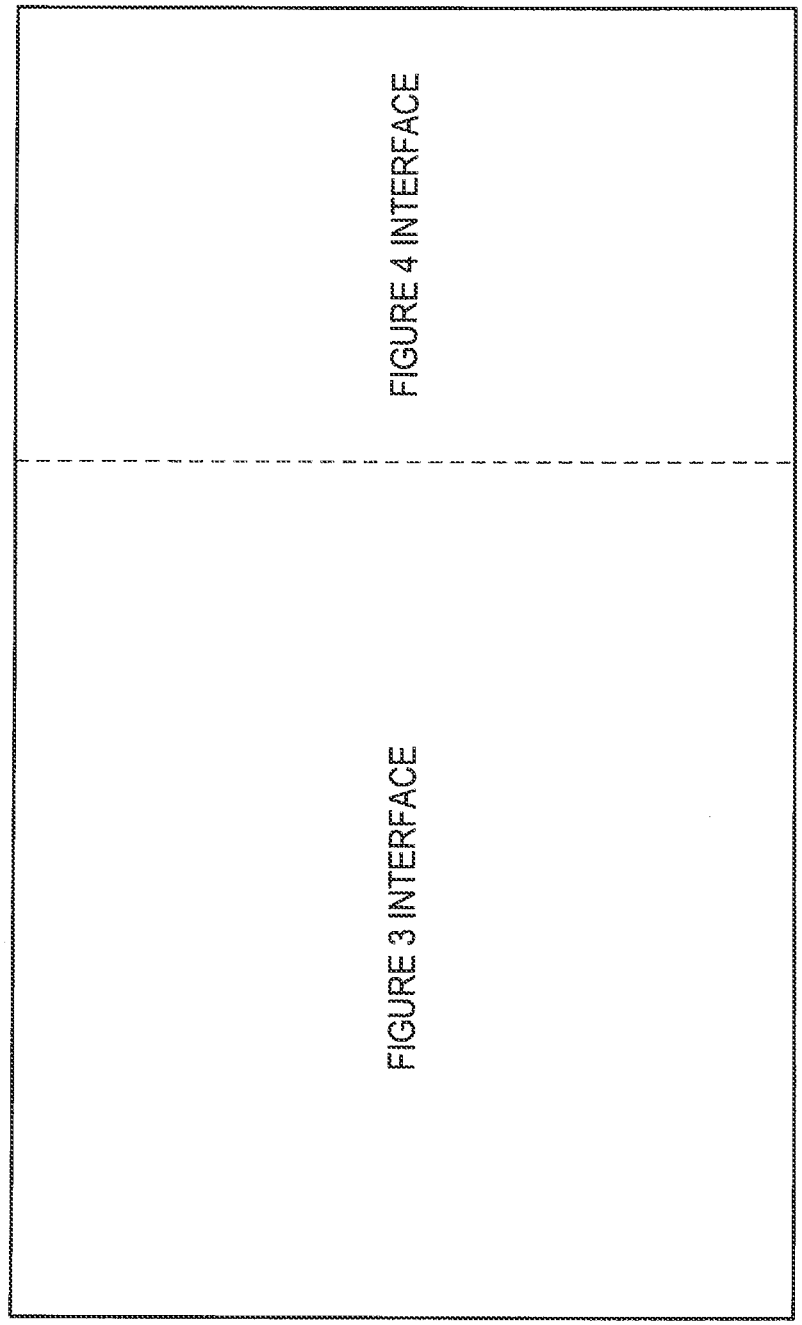
FIG. 4A illustrates an example of how the navigation pane of FIG. 3 and FIG. 4 may be displayed together.

FIG. 3 may be displayed with FIG. 4 as shown in FIG. 4A. FIG. 4 is a navigation pane for the user interface of FIG. 3. Together, FIG. 3 and FIG. 4 illustrate system monitoring details for different components of the above selected system and the status of different metrics of those components. Not shown is a well known refresh frequency of the application, which can be configurable. A refresh frequency of every five minutes, as one example, can be used. Other frequencies may be selected by the administrator. Also not shown is the usual "bread crumb" for navigation. FIG. 3 gives an overview of the system components and hierarchy, including events like a collection of metrics evaluated together, explained in additional detail below. Event and metric details, selectable by the administrator by clicking, are shown at the navigation pane of FIG. 4. These can include ratings (color coded red, yellow, green, or grey, if desired) to show an event, event status, metric, metric value, and threshold. In one example, if there were a red/yellow status of a metric at Host 91 in FIG. 3, it would mean the metric can be propagated to a higher layer (for example, Instance 89 to Technical System 83). The Receiving Status lines represent the status of the receiving event from the below layer. This can be evaluated along with other metrics that are measured in the same layer. What is happening on Database and Instance can be checked by opening the tree under B4Y (cylinder icon in FIG. 3) and B4Y-JAVA-LDAI1_B4Y_78 or B4Y-JAVA-LDCI1B4Y_B4Y_78. System availability and performance can be two categories under which metrics could be grouped. There can also be exception (short dumps, thread dumps) and configuration (alerts due to configuration changes) under which certain metrics can be grouped. It is possible for the administrator to switch categories by clicking or other selection. For example, monitoring data can be divided into categories, such as availability (like system or host availability), configuration (like profile parameter changes), exception (like thread dumps and ABAP short dumps) and performance (like CPU utilization, memory, and the like). For example, icon 81 can indicate that performance of Technical System B4Y-JAVA is red, which means that the system is experiencing performance bottlenecks. This could be due to the system itself or its underlying components, such as Instance, Database, or Host. Technical System 83 can indicate that the box represents a Technical System. The name of the component (in this case a Technical System) is B4Y-JAVA, which is the system the Administrator selected, as discussed above with respect to FIG. 3. Icon 87 can indicate that the box represents a Database Instance, in this case Database B4Y. Instance 89 can indicate that the box represents a Technical Instance. A Technical Instance is a way to scale out the system. Each instance gets allocated system resources such as memory, processes, and the like. When the number of users in a system increases, it is normal to add a new Host and instance to a system such as the SAP system used as an example. With this, half of the user requests can be handled by the second instance. Host 91 can indicate that the box represents a host or server. Icon 93 can indicate the total number of alerts on the component (in this case it shows that four alerts are present on host 1D8039). Icon 95 can indicate an event and its rating.

As can be seen at 97 in FIG. 4, there can be many metrics for memory. These can be grouped together and evaluated based on a rule. The result of this evaluation is the rating seen at the event "Memory." An event can be configured at design time by grouping together multiple metrics based on a rule such as average, worst case, and the like. It can be evaluated at runtime, based on the rule, to arrive at a rating. FIG. 4 illustrates a list of metrics 97 for a host that can be grouped under the event "Memory." In FIG. 4, under B4Y-JAVA, two categories are shown defined. These are Availability and Performance. When a user opens one of those nodes, the user can see events and metrics that are defined for that category. For Performance, no metrics are defined at the Technical System Layer for the SAP system used as an example. Instead, its status is determined by the status of the underlying Layer, Instance and Host. Hence, as illustrated, the system has only Receiving Status from Instance and Host, although many different combinations may be used. The metric value 99 can be color coded to indicate a rating based on the threshold. The vertical lines (which can be color coded red and yellow in the next example below) are indications of threshold values for the metric. If a particular metric exceeds a threshold, it can get a yellow or red rating depending on the actual threshold. A red/yellow metric can result in turning an event red/yellow, which could result in an end-user alert. The presence of icon 100 indicates that historical values are available (in Business Intelligence (BI)) for that metric. The icon is clickable and a BI-based report can be launched with the historical values for the metric.

Figure 5:
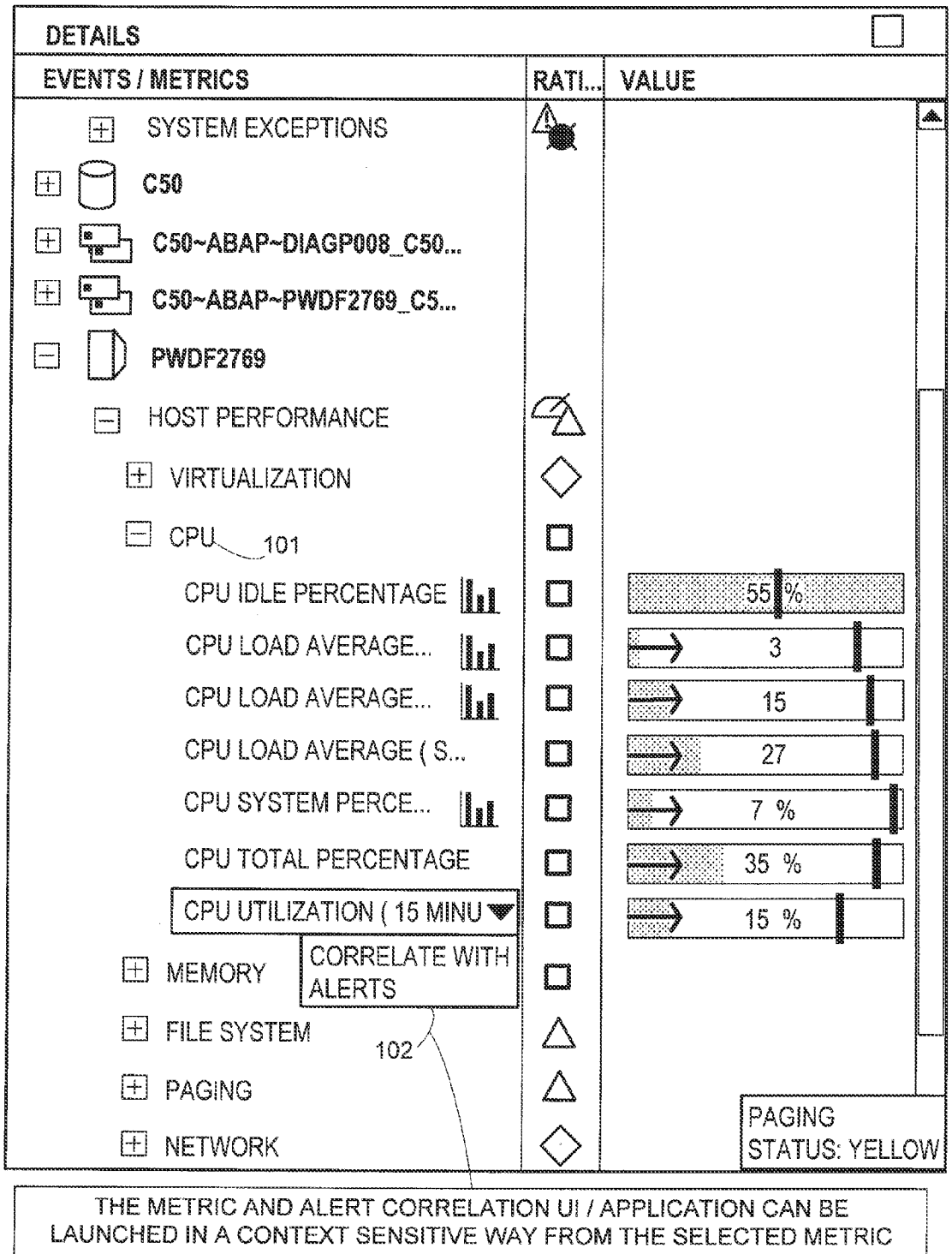
FIG. 5 is an illustration similar to FIG. 3 that includes additional context.

FIG. 5 is substantially FIG. 3 but with context added. For example, when clicked, the CPU icon 101 can display a drop-down list. As indicated in the drop-down list on the figure, the CPU metrics of a host is shown in a monitoring application, for example, the SAP Solution Manager. When the administrator notices a situation that needs further investigation (in this case, CPU Utilization), he or she can open the context menu 102 available for that metric. In the dropdown menu item "Correlate with Metrics," the administrator is provided an option that offers a possibility to correlate this metric to alerts in a given time frame. This correlation may be accomplished, in one embodiment, as explained in the above-mentioned copending patent application.

In order to obtain these notifications, the administrator needs first to configure the thresholds for the metrics. If the measurement of the metric is above (or below, as the case may be), the alert or notification may be provided. These thresholds are usually set based on default values from the delivered system templates or based on experience of the administrator. Some metric thresholds set in this way may not be accurate. Or they might change over time, resulting in false notification (for example, a threshold that is configured too low) or no notification (a threshold that is configured too high). For example, a threshold for CPU utilization may be set as 85%. After a few months, additional users or business processes may be included in the system resulting in a higher CPU utilization, for example an average CPU utilization of approximately 90%. Because of 85% having been set as the threshold, the system administrator will be getting a false notification of high CPU usage every day. In this case, "false" is used in the sense that higher CPU usage would be expected if more users or processes are added to the system. When this occurs, the administrator may manually check the thresholds and correct them. This can be a time consuming and error-prone action.

However, to alleviate the foregoing situation, certain metrics may be set for "Auto-adjustment of threshold". For metrics which are set as "Auto-adjusting thresholds", of "Self-adjusting thresholds" the system may dynamically determine the threshold based on the average metric values for the last "N" days (or N hours, or N weeks, or N months, etc., as may be desired). In one embodiment, when auto-adjusting threshold is used, the system automatically calculates the average CPU utilization based on the last "N" days activity and may determine a higher threshold for this metric in the system, thus alleviating the above false notification problem. This will help ensure that the threshold is appropriately maintained and that correct notifications are reaching the administrator as discussed in further detail below. There may be multiple tiers used in auto-adjust as illustrated with respect to FIG. 8, which will be discussed below.

Figure 6:
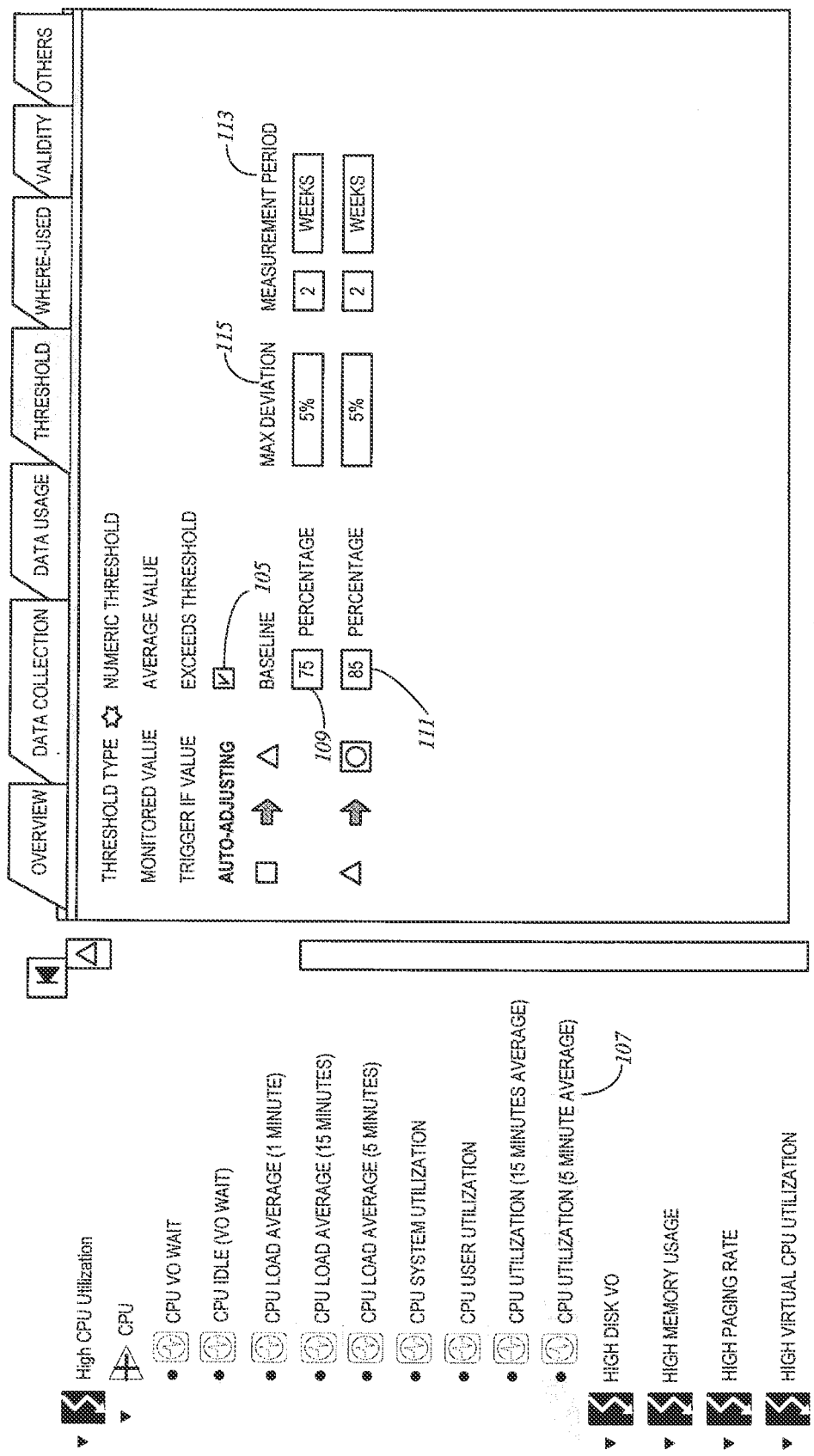
FIG. 6 is a screen shot illustrating setting up auto-adjust in accordance with an example embodiment.

With reference to FIG. 6, a screen shot illustrating setting up auto-adjust in one embodiment, may be as follows. During metric definition, a flag 105 may be used that can be set to indicate to the system hardware and software that the threshold of a particular metric will be auto-adjusted. In this illustration the metric is CPU Utilization (5 Minute Average) 107. Measurements of given metric are continuously taken. In this example the CPU Utilization metric is continuously measured every 5-minutes. These measurements may be termed $M_1, M_2, \ldots, M_i$ with $M_1$ being the first measurement, $M_2$ the second measurement, ..., $M_i$ the $i^{th}$ measurement.

A base value for the threshold for metric 109 is indicated as "Baseline." This may be set by the administrator as it is done without "auto-adjust" being used (for example, using the default value as per the template, or using a value based on the administrator's experience). For this metric type, there are two stages of alerting. One is a warning (yellow alert), represented at 109, and the other is a real alert (red alert) 111, yellow alert and red alert having been discussed in more detail above. Typically, administrators set a warning threshold and an alert threshold. In the example in FIG. 6, the system will give a yellow alert if the CPU utilization exceeds 75% (green to yellow threshold exceeded) and a red alert if CPU Utilization exceeds 85% (yellow to red threshold exceeded). Measurement Period 113 may be specified by the system administrator, and represents the time duration over which an average of the measured values of the metric may be calculated. This measurement period may be specified in time periods that are long enough for the system to learn. By a time period that is long enough "for the system to learn" means that the number of metric measurements taken during that time period is sufficient for the average of the measurements to provide a true indication of activities actually going on in the system. In one embodiment the time period may be set to weeks. However, if hours, days, weeks, months or any other desired duration allows system learning, that period may be used. Max Deviation 115 is a percentage value which may be set by the administrator to minimize high deviations of thresholds from the baseline due, for example, to an unusually high system load during a month-end closing that might cause certain metrics values to exceed threshold by an overly large margin. In this case, the resulting threshold for the following week might be set, based on the high system load of the previous week, to a very high value. However, with Max deviation 115, it is possible to limit the variation to a given percentage, say 5%.

FIGS. 7A through 7D illustrate the concepts of "threshold," "old threshold," and "new threshold."

Figure 7A:
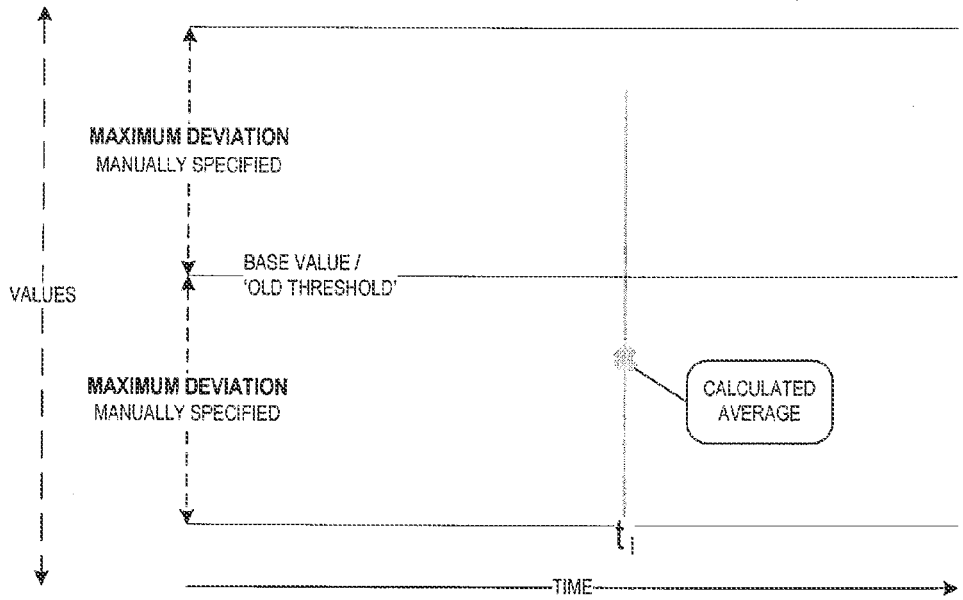
FIG. 7A through FIG. 7D illustrate various cases of a threshold in terms of a baseline value and a maximum deviation, in accordance with an example embodiment.
Figure 7B:
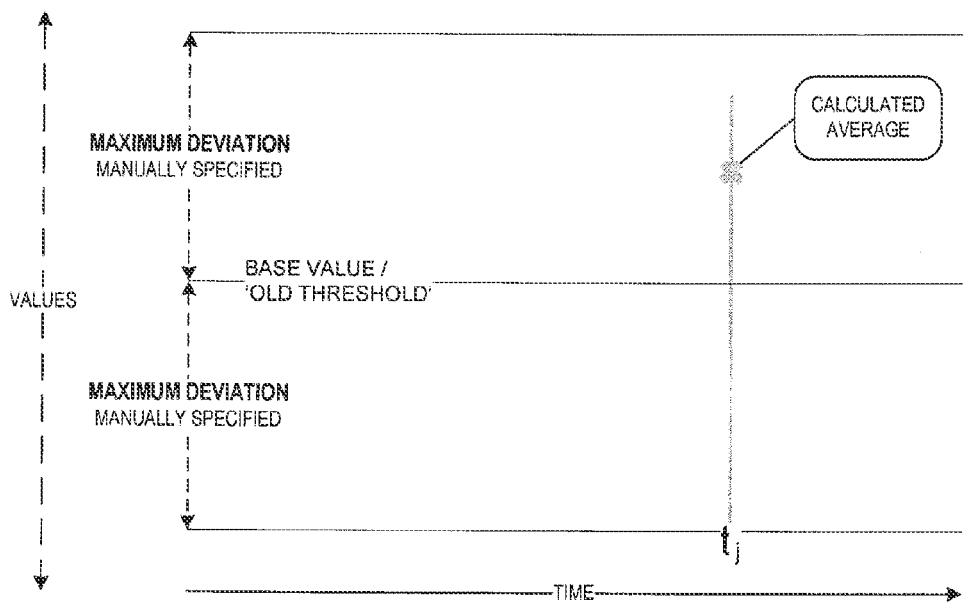

FIGS. 7A and 7B illustrate Case A. With the base value 701 as the threshold, here the "old threshold," the calculated average of measurements over time $P_M$ is calculated. If the calculated average is less than or equal to the base value 701 plus the maximum deviation, or if the calculated average is greater than or equal to the base value minus the maximum deviation, the calculated average becomes the "new threshold."

Figure 7C:
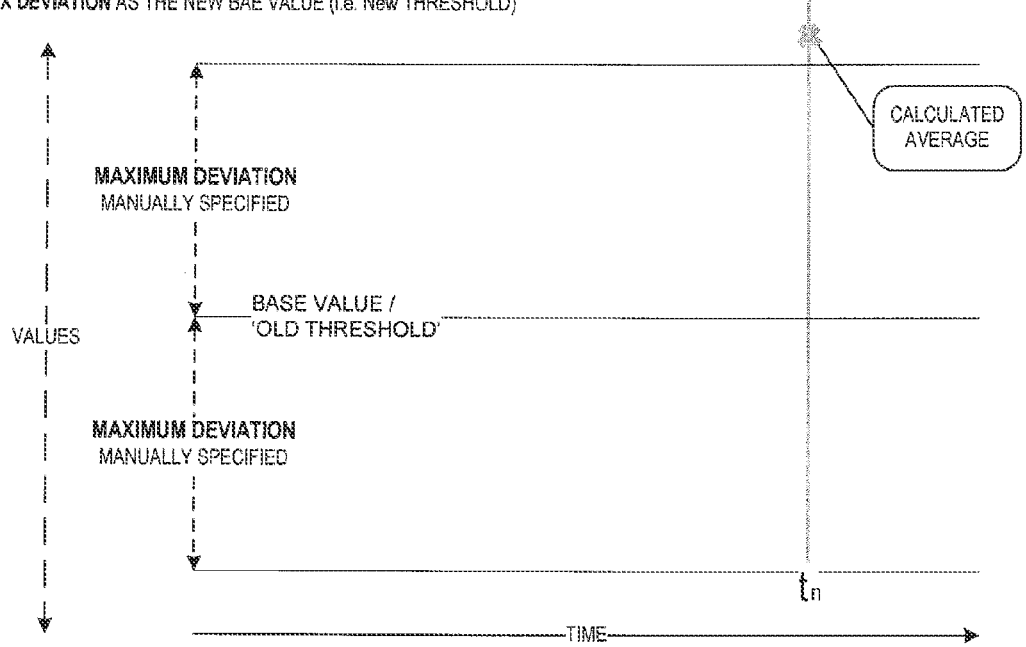

FIG. 7C illustrates Case B. With the base value 701 as the threshold, here the "old threshold," the calculated average of measurements over time $P_M$ is calculated. If the calculated average is greater than the base value 701 plus the maximum deviation, the base value plus the maximum deviation becomes the "new threshold."

Figure 7D:
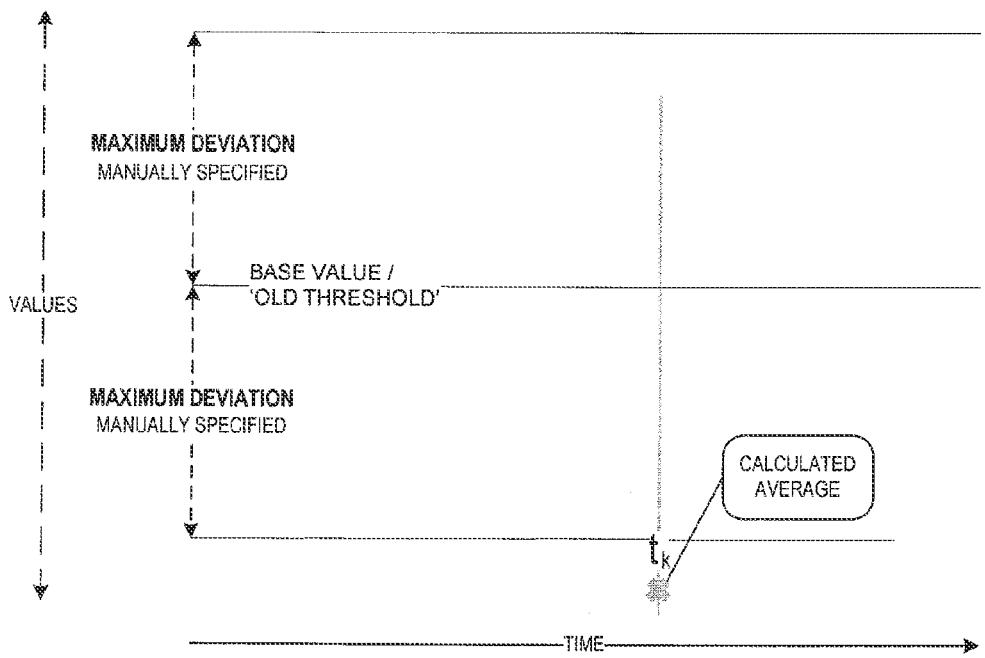

FIG. 7D illustrates Case C. With the base value 701 as the threshold, here the "old threshold," the calculated average of measurements over time $P_M$ is calculated. If the calculated average is less than the base value 701 minus the maximum deviation, the base value minus the maximum deviation becomes the "new threshold."

Finally, as to what the "Deviation" is based on, human intervention may be needed, that is "what looks like too much of an exception to the administrator". The human administrator may know more about the situation, such as "too many new joiners asking for logon last week", "Quarter-end closing", the "Finance organization is working around the clock", and similar situations. This information may then be used to set the Maximum Deviation discussed above.

Figure 8:
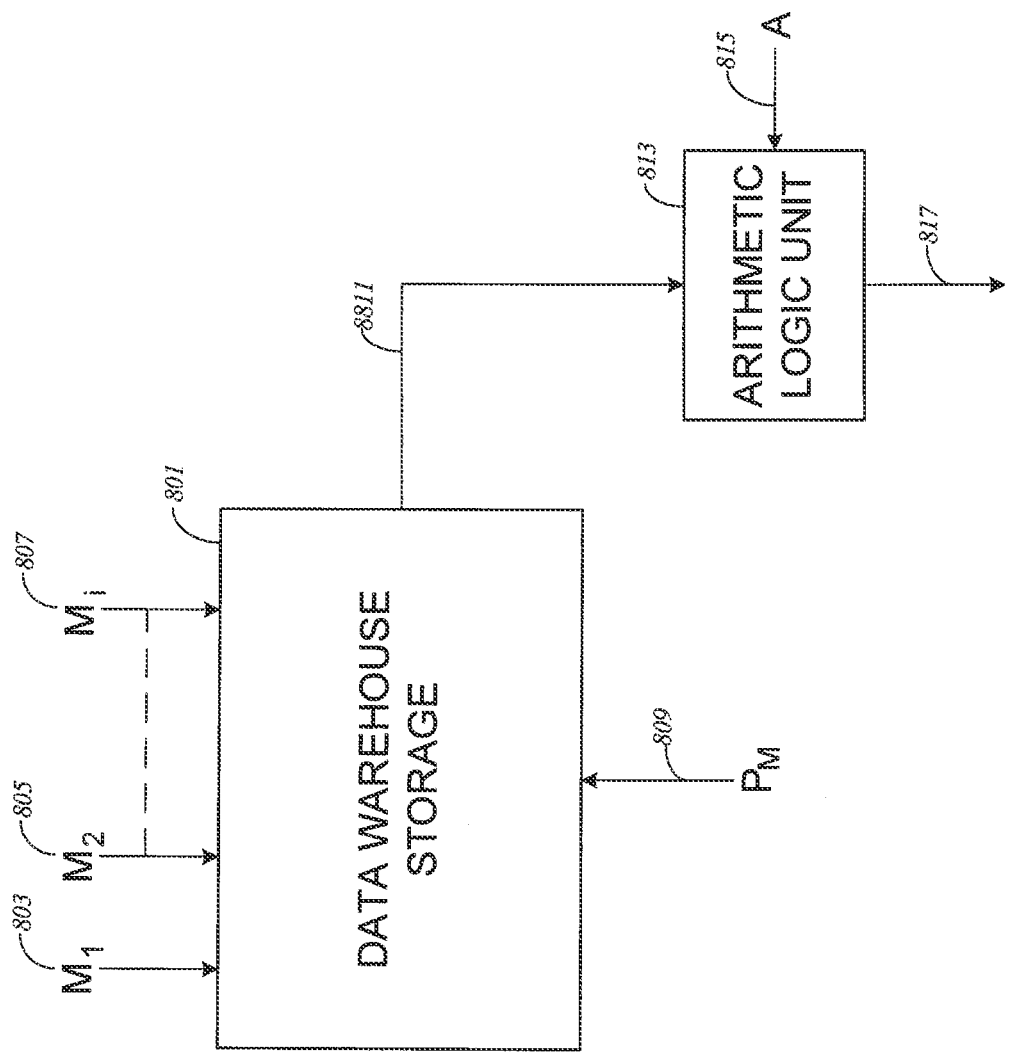
FIG. 8 illustrates a circuit for calculating an average in accordance with an example embodiment.

Referring now to FIG. 8, measured values, $M_1, M_2, \ldots, M_i$, of metric M, respectively 803, 805, ... 807, as and when measured (for example, 1-minute intervals, 5-minute intervals, 1-day intervals, etc.), are collected in storage, herein termed a data warehouse 801. In the above example, metric CPU Utilization ("M") is measured every 5-minutes. This may be interpreted to mean that measurement $M_1$ is taken at 5 minutes after the beginning, $M_2$ is taken at ten 10 minutes after the beginning, ..., and $M_i$ is taken at (5×i) minutes after the beginning. The data warehouse 801 stores historical measured values for metrics, the given metric in this example referred to as M. Historical measurements for other metrics (not shown in FIG. 8) may also be stored in 801. Based on historical values, an average can be calculated. For example, given a "Measurement Period" for metric M, such measurement period termed $P_M$, storage 801 receives a signal over line 809 instructing it to read the values $M_1, M_2, \ldots, M_i$ (803, 805, 807, respectively) measured over time period $P_M$ to arithmetic logic unit (ALU) 813 by way of line 811. ALU 813 may then receive a signal A over line 815 which is a signal that instructs the ALU to calculate the average of measured values $M_1, M_2, \ldots M_i$. That is, the ALU calculates the average of the measured values of the computer metric over a predetermined time period.

With the combination of this average value of the measurements of metric M for the Measurement Period $P_M$, the system may calculate a new threshold based on the average of the measured values of the computer metric M over the predetermined time period $P_M$, which may be based on the numerical relationship of the average to the baseline and maximum deviation, as explained above with respect to FIGS. 7A-7D.

Figure 9A:
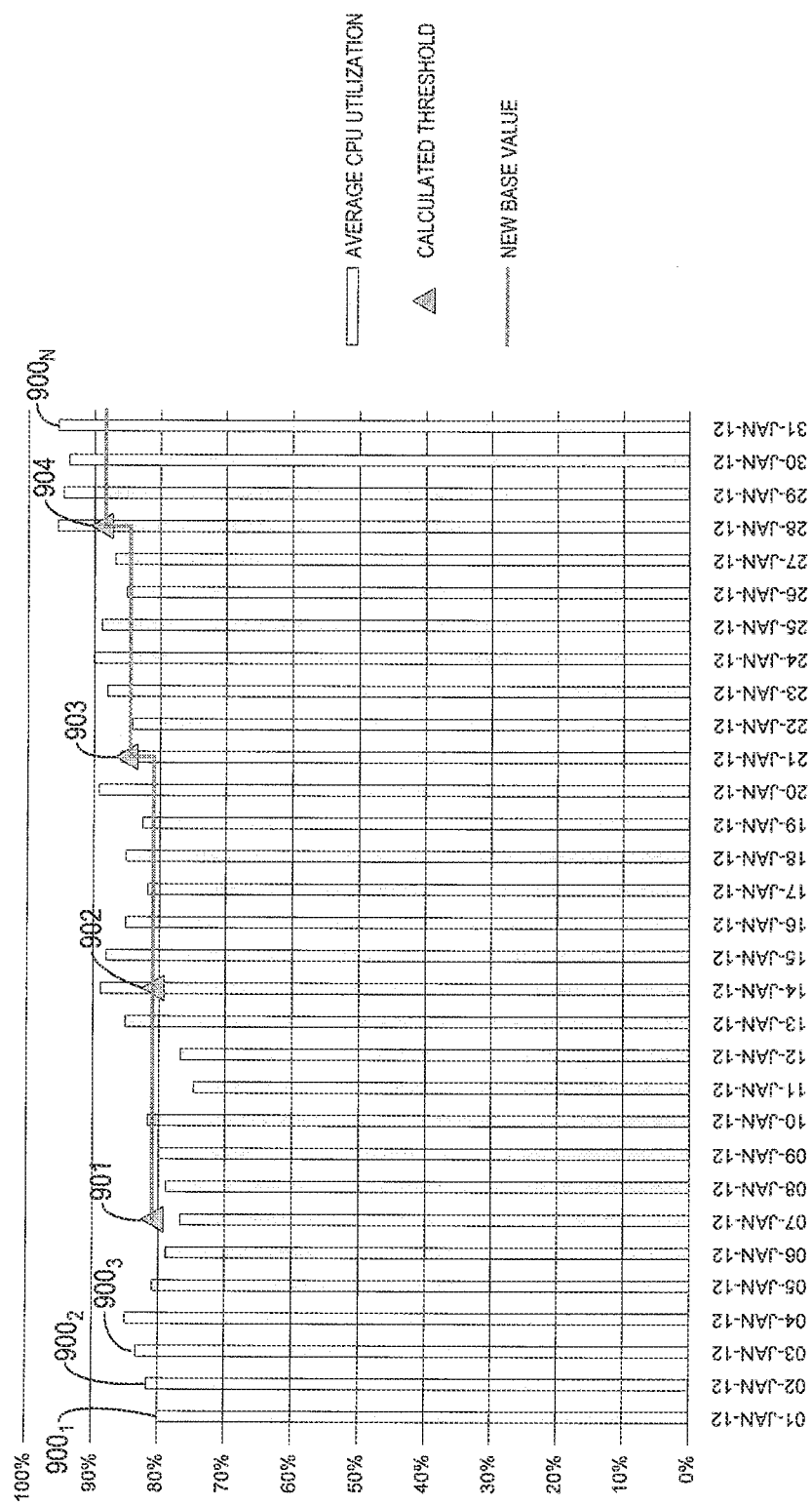
FIG. 9A illustrates a graphic usable in explaining computation of averages of a computer metric in accordance with an example embodiment.

One embodiment of the above may be seen in FIG. 9A in graphic format, with calculations for the graphic of FIG. 9A seen in FIG. 9B. In the example of FIG. 9A, in one embodiment, as mentioned above, the metric CPU Utilization may be measured every 5-minutes. The daily average of the measurements may be calculated and entered on the graphic of FIG. 9A for each day, such as at $900_1, 901_2, 900_3 \ldots 900_N$. The graphic of FIG. 9A illustrates the possibility of variance of threshold on an ongoing basis. In one embodiment, a Measurement Period of one-week may be used that calculates the daily averages over a one-week period. A number of triangles, 901, 902, 903, 904 are included on FIG. 9A after every week to indicate the calculated threshold over the one week period. That is, daily averages are averaged over one week and a new threshold is calculated as discussed above with respect to FIGS. 7A-7D. Therefore, the system adjusts the threshold every week based on the last seven-day average. Four such calculation periods are shown. This may be viewed as taking a weekly average of daily averages, or "an average of averages." In this regard continuously taking measurements of the value of the computer metric at a predetermined rate (weekly) comprises taking measurements of the value over a first time period (daily, here every five minutes) and calculating the average of the measurements of the value that are taken over that first time period (daily). Calculating the average of the measurements of the value of the computer metric over a predetermined time period (one week) would then comprise calculating, over that predetermined time period (one week), the average of the average of the measurements that are taken over the first time period (daily). This may be seen with respect to FIG. 9A for weekly averages at 901, 902, 903, 904.

Figure 10:
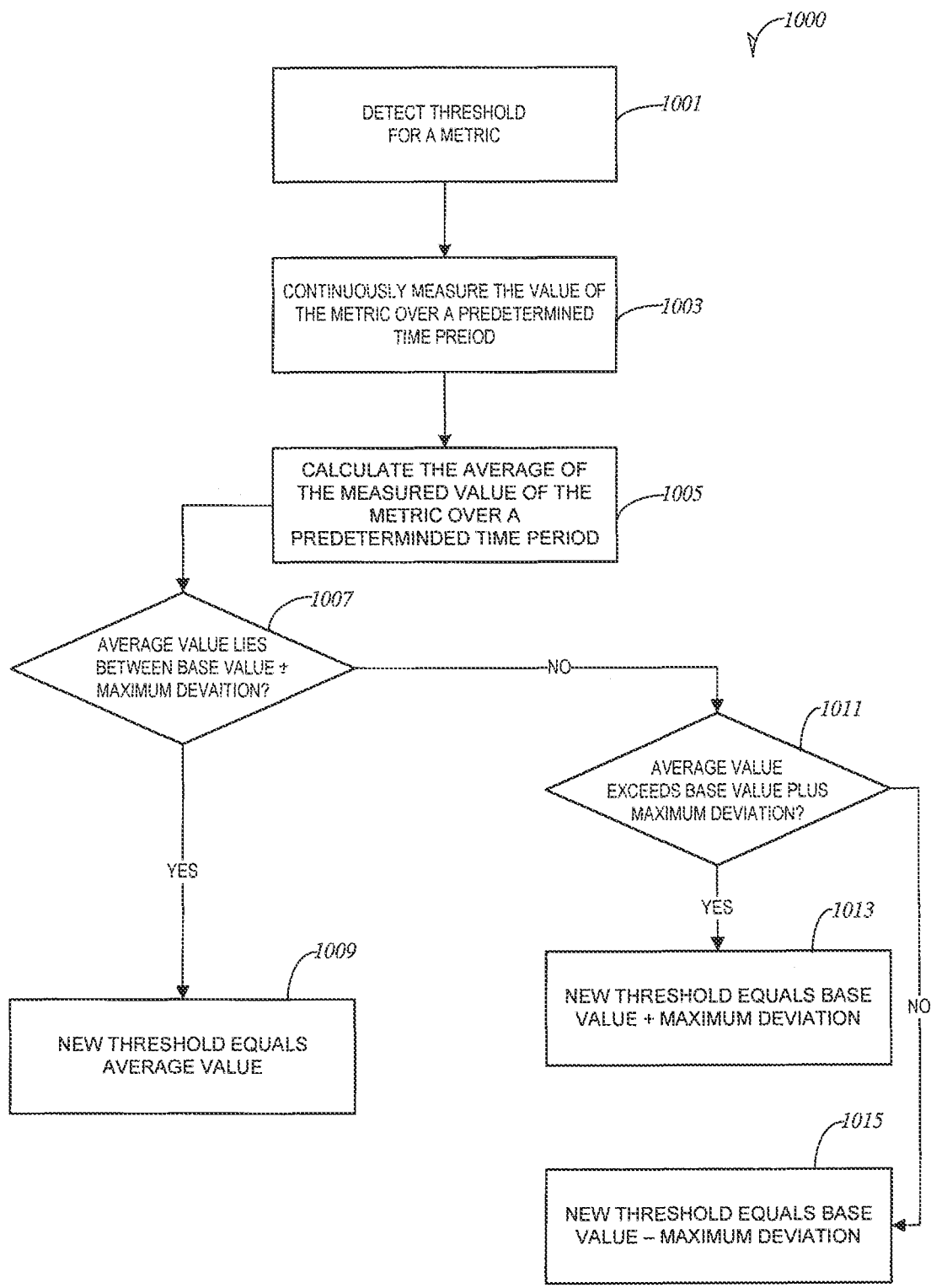
FIG. 10 is a flow chart illustrating auto-adjust of a computer metric in accordance with an example embodiment.

FIG. 10 illustrates a flow chart 1000 of one embodiment discussed above with respect to FIGS. 7A to 7D. At 1001, a current threshold is detected. At 1003 measurements of the value of the computer metric are continuously taken at a predetermined rate. At 1005 the average of the measured values of the computer metric is calculated over a predetermined time period $P_M$. At 1007 a calculation is made to determine whether the average value lies between the baseline plus or minus the maximum deviation. If a YES decision is taken at 1007, the threshold is set to the calculated average value at 1009. If a NO decision is taken at 1007, then at 1011 a calculation is made to determine whether the average value exceeds the base line plus the maximum deviation. If a YES decision is taken at 1011, the threshold is set to the base value plus the maximum deviation at 1013. If a NO decision is taken at 1011, the threshold is set to the base value minus the maximum deviation at 1015.

Figure 11:
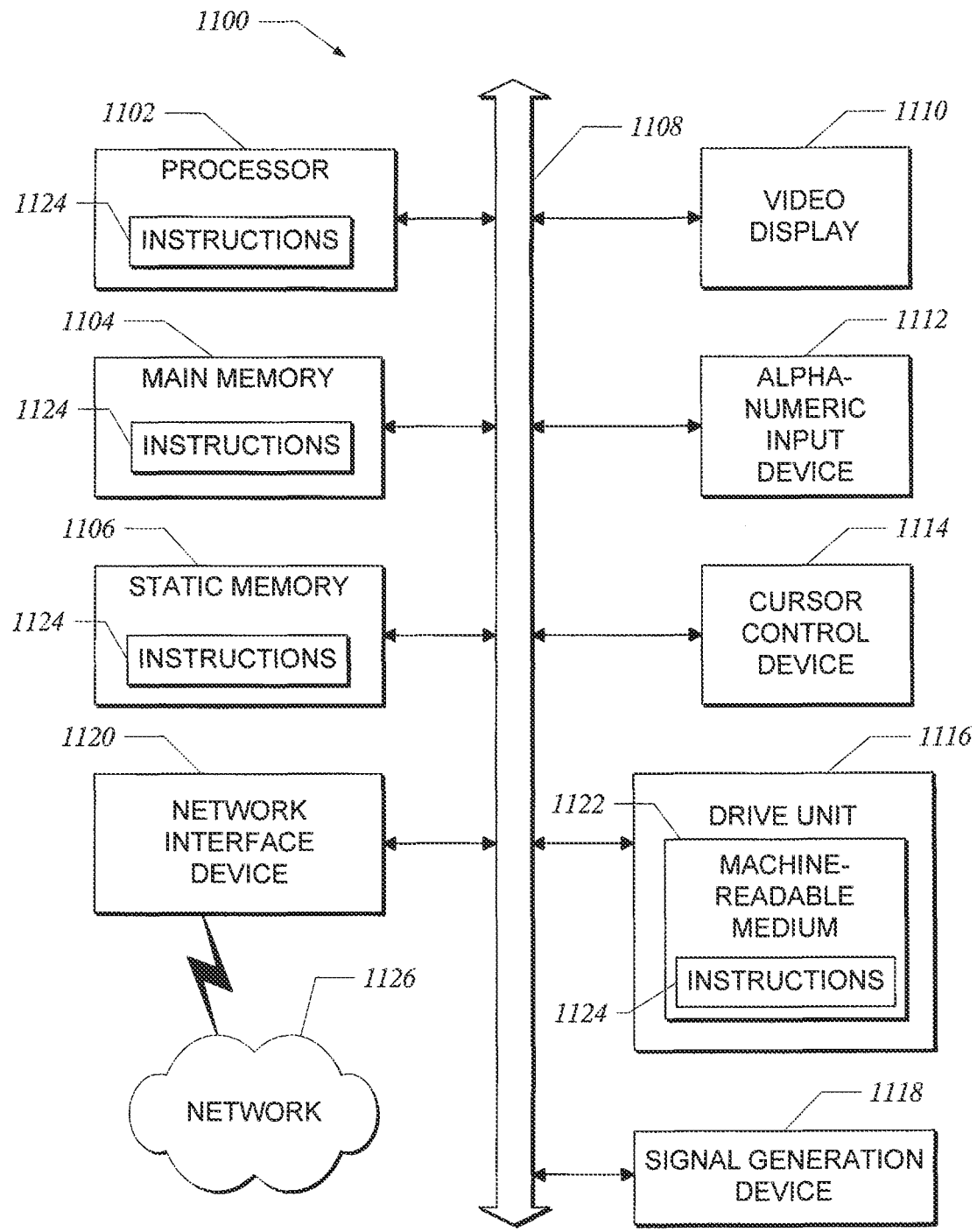
FIG. 11 depicts a block diagram of a machine in the example form of a computing device within which may be executed a set of instructions for causing the machine to perform any one or more of the methodologies discussed herein.

FIG. 11 depicts a block diagram of a machine in the example form of a computing device 1100 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The example of the computing device 1100 includes a processor 1102 (e.g., a CPU, a graphics processing unit (GPU), or both), a. main memory 1104 (e.g., random access memory) and a static memory 1106 (e.g., static random-access memory), which communicate with each other via a bus 1108. The computing device 1100 may further include a video display unit 1110 (e.g., a plasma display, a liquid crystal display (LCD) or a cathode ray tube (CRT)). The computing device 1100 also includes an alphanumeric input device 1112 (e.g., a keyboard), a UI navigation device, such as cursor control device 1114 (e.g., a mouse), a disk drive unit 1116, a signal generation device 1118 (e.g., a speaker), and a network interface device 1120.

The disk drive unit 1116 (a type of non-volatile memory storage) includes a machine-readable medium 1122 on which is stored one or more sets of data structures and instructions 1124 (e.g., software) embodying or utilized by any one or more of the methodologies or functions described herein. The data structures and instructions 1124 may also reside, completely or at least partially, within the main memory 1104 and/or within the processor 1102 during execution thereof by computing device 1100, with the main memory 1104 and processor 1102 also constituting machine-readable, tangible media.

The data structures and instructions 1124 may further be transmitted or received over a computer network 1126 via a network interface device 1120 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 1100) or one or more hardware modules of a computer system (e.g., a processor 1102 or a group of processors) may be configured by software (e.g., an application or application portion) as a hardware module that operates to perform certain operations as described herein. Furthermore, the routines, methods and operations executed to implement the embodiments as described herein, which may be described as software methods, may also be implemented as microcode or other instructions in integrated circuit chips, or may be implemented in the operations of the various transistor circuits or other storage in integrated circuit chips.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 1102 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 1102 configured using software, the general-purpose processor 1102 may be configured as respective different hardware modules at different times. Software may accordingly configure a processor 1102, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 1102 that are temporarily configured (e.g., by software) or permanently configured to perform the relevant operations. Whether temporarily or permanently configured, such processors 1102 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 1102 or processor-implemented modules. The performance of certain of the operations may be distributed among the one or more processors 1102, not only residing within a single machine, but deployed across a number of machines. In some example embodiments, the processors 1102 may be located in a single location (e.g., within a home environment, an office environment or as a server farm), while in other embodiments, the processors 1102 may be distributed across a number of locations.

While the embodiment(s) is (are) described with reference to various implementations and exploitations, it will be understood that these embodiments are illustrative and that the scope of the embodiment(s) is not limited to them. Many variations, modifications, additions, and improvements are possible.

In general, the routines executed to implement the embodiments discussed herein may be implemented as part of an operating system or a specific application, component, program, object, module or sequence of instructions referred to as "computer programs." The computer programs typically comprise one or more instructions set at various times in various memory and storage devices in a computer that, when read and executed by one or more processors in a computer, cause the computer to perform operations to execute elements involving the various aspects of the embodiments. Moreover, while the embodiments have been described in the context of fully functioning computers and computer systems, those skilled in the art will appreciate that the various embodiments of the invention are capable of being distributed as a program product in a variety of forms, and that the invention applies equally regardless of the particular type of signal bearing media used to actually effect the distribution. Examples of signal bearing media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links. Furthermore, the routines, methods and operations executed to implement the embodiments may be implemented as microcode or other instructions in integrated circuit chips, or may be implemented in the operations of the various transistor circuits in integrated circuit chips.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of automatically setting a new threshold for a computer metric, the method comprising:
   using at least one computer processor:
      detecting a threshold for the computer metric;
      specifying a base value for the threshold of the computer metric;
      specifying a deviation beyond the base value;
      continuously measuring values of the computer metric at a predetermined rate;
      calculating the average of the measured values of the computer metric over a predetermined time period;
      determining whether the average lies between the base value plus or minus the specified deviation; and
      setting the new threshold for the computer metric to the average based on the average being between the base value plus or minus the specified deviation.

2. The method of claim 1, further comprising, based on the specified deviation being reached, issuing an alert with respect to the computer metric.

3. The method of claim 1 further comprising:
   determining whether the average exceeds the base value plus the specified deviation; and
   based on the average exceeding the base value plus the specified deviation, setting the new threshold to the base value plus the specified deviation and, based on the average not exceeding the base value plus the specified deviation, setting the new threshold to the base value minus the specified deviation.

4. The method of claim 1 wherein:
   the continuously measuring values of the computer metric at a predetermined rate comprises taking measurements of the values over a first time period and calculating the average of the measurements that are taken over the first time period; and
   the calculating the average of the measurements over a predetermined time period comprises calculating, over the predetermined time period, the average of the average of the measurements that are taken over the first time period.

5. The method of claim 1 wherein the base value is set by a system administrator.

6. The method of claim 1 wherein the specified deviation is set by a system administrator.

7. A machine-readable storage device having embedded therein a set of instructions which, when executed by the machine, causes the machine to execute the following operations:
   detecting a threshold for the computer metric;
   specifying a base value for the threshold of the computer metric;
   specifying a deviation beyond the base value;
   continuously measuring values of the computer metric at a predetermined rate;
   calculating the average of the measured values of the computer metric over a predetermined time period;
   determining whether the average lies between the base value plus or minus the specified deviation; and setting a new threshold for the computer metric to the average based on the average being between the base value plus or minus the specified deviation.

8. The machine-readable storage device of claim 7 the operations further comprising, based on the specified deviation being reached, issuing an alert with respect to the computer metric.

9. The machine-readable storage device of claim 7, the operations further comprising:
determining whether the average exceeds the base value plus the specified deviation; and
based on the average exceeding the base value plus the specified deviation, setting the new threshold to the base value plus the specified deviation and, based on the average not exceeding the base value plus the specified deviation, setting the new threshold to the base value minus the specified deviation.

10. The machine-readable storage device of claim 7, wherein:
the continuously measuring values of the computer metric at a predetermined rate comprises taking measurements of the values over a first time period and calculating the average of the measurements that are taken over the first time period; and
the calculating the average of the measurements over a predetermined time period comprises calculating, over the predetermined time period, the average of the average of the measurements that are taken over the first time period.

11. The machine-readable storage device of claim 7 wherein the base value is set by a system administrator.

12. The machine-readable storage device of claim 7 wherein the specified deviation is set by a system administrator.

13. A system for automatically calculating a threshold for a computer metric, the system comprising:
at least one computer processor configured to:
detect a first threshold for the computer metric;
specify a base value for the first threshold of the computer metric;
specify a deviation beyond the base value;
continuously measure values of the computer metric at a predetermined rate;
calculate the average of the measured values of the computer metric over a predetermined time period;
determine whether the average lies between the base value plus or minus the specified deviation; and
set a second threshold for the computer metric to the average based on the
average being between the base value plus or minus the specified deviation.

14. The system of claim 13 wherein the at least one processor is further configured to, based on the specified deviation being reached, issue an alert with respect to the computer metric.

15. The system of claim 13 wherein the at least one computer processor:
determines whether the average exceeds the base value plus the specified deviation; and
based on the average exceeding the base value plus the specified deviation, sets the second threshold to the base value plus the specified deviation and, based on the average not exceeding the base value plus the specified deviation, sets the second threshold to the base value minus the specified deviation.

16. The system of claim 13, wherein:
continuously measuring values of the computer metric at a predetermined rate comprises the at least one processor configured to take measurements of the value of the computer metric over a first time period and to calculate the average of the measurements that are taken over the first time period; and
calculating the average of the measurements over a predetermined time period comprises the at least one computer processor configured to calculate, over the predetermined time period, the average of the average of the measurements that are taken over the first time period.

17. The system of claim 13 wherein the base value is set by a system administrator.

18. The system of claim 13 wherein the specified deviation is set by a system administrator.

* * * * *